United States Patent Office 3,177,171
Patented Apr. 6, 1965

3,177,171
PROCESS FOR REACTING AMMONIA OR A PRIMARY AMINE WITH AN ACROLEIN POLYMER AND RESULTING PRODUCT
Elbert E. Gruber, Cuyahoga Falls, and Edward F. Kalafus, Akron, Ohio, assignors to The General Tire & Rubber Company, Akron, Ohio, a corporation of Ohio
No Drawing. Filed Oct. 8, 1959, Ser. No. 845,099
7 Claims. (Cl. 260—29.6)

This invention relates to modifications of acrolein polymers and copolymers and particularly, to their reaction products with ammonia and primary amines which are useful as cationic emulsifiers for emulsion polymerization and in the dispersion of pigments, etc.

Acrolein and alpha substituted acroleins

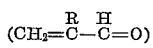

may readily be polymerized with persulphate catalysts or initiators and the like in the presence of stabilizers and water to provide a polyacrolein latex which can be coagulated and dried. For example, a polymer of methacrolein has the following general formula:

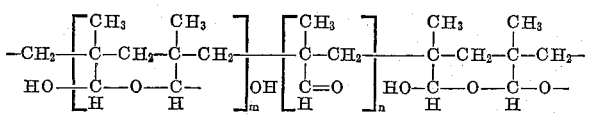

It has a minor amount of aldehyde groups disposed along the chain with a predominating amount of acetal type rings most of which are joined together as shown above. The ends of the acetal groups are terminated with hydroxyl radicals as disclosed. $m$ is an integer greater than 5 and $n$ is an integer greater than 1.

However, since the methacrolein polymer obtained is relatively infusible and insoluble, it has had only limited use. It, thus, would be highly desirable to convert this polymer into a highly useful material, such as an emulsifier and the like and, accordingly, it is a primary object of the present invention to provide a method for modifying acrolein polymers so that they can be used in cationic emulsification processes and the like.

Another object is to provide a modified acrolein polymer which is useful as a cationic emulsifier in polymerization processes and the like.

These and other objects and advantages of the present invention will become more apparent to those skilled in the art from the following detailed description and examples.

In accordance with the present invention a polymer with unusually desirable properties has been discovered as the amine addition product of a substantially linear acrolein or alpha substituted acrolein polymer and the like by reacting the same with ammonium hydroxide, ammonia, and/or primary amines.

The Cannizzaro reaction is not generally effected by weak bases such as ammonia and primary amines. With aldehydes, a Schiff base is obtained as follows:

The final product obtained may be one of forming first a Schiff base followed by ring closure.

For example, analysis of the product of polymethacrolein and ammonia gave 9.71% N; 66.12% C; 9.63% H; and 14.37% oxygen. The reaction of ammonia with the polymethacrolein is believed to occur according to one or both of the following two equations:

(I)

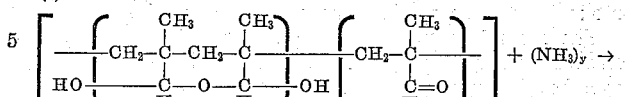

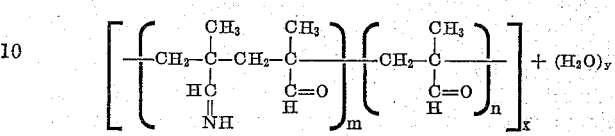

and (II)

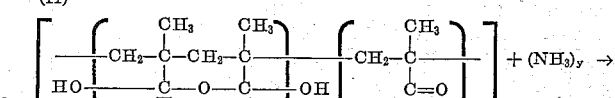

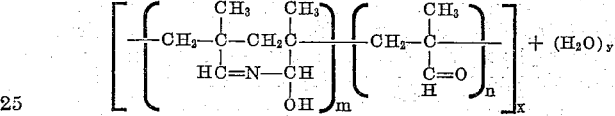

where $x$ and $y$ are integers. This reaction product has no alcohol nor acid group, viz,

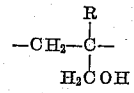

or

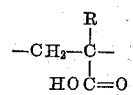

The formulae represented above are in substantial agreement with analytical findings. Since the reaction conditions can supply sufficient ammonia to react with all the acetal-like groups, there are probably no acetal groups in the final product. The ammonia breaks up the individual or connected acetal groups of the acrolein polymer to provide separate groups. However, less than the required amount of ammonia can be used if desired to obtain some of the benefits of this invention. Such products can contain about 25% or more of the newly formed amine addition units. This product is soluble in acid media but insoluble in alkaline media. For example, when this amine type addition product was boiled for 2 hours in sodium hydroxide solution, it did not dissolve and, thus, the structures shown are believed to be correct. On the other hand, addition products obtained by reacting polymethacrolein with a strong base such as sodium hydroxide solution are readily soluble in alkaline media but insoluble in acids.

The term "acrolein polymer" is here used generically to include copolymers having a substantial or a predominating amount of acrolein or alpha substituted acrolein residues. Copolymers of acrolein with one or more diolefinic compounds of less than 8 carbon atoms, including the conjugated diolefines, such as butadiene, isoprene, chloroprene, cyanoprene, dimethyl butadiene and mixtures thereof, and/or with a copolymerizable mono-olefinic compound such as styrene, acrylonitrile, methyl isopropenyl ketone, and mixtures thereof can be used. Other available, olefinically-unsaturated, polymerizable organic compounds can also be used and subjected to the process described above to form compounds with similar unusual properties. As the amount of acrolein or substituted acrolein in the copolymer is reduced, however, the number of acetal and aldehyde groups in the copolymer is reduced and the unusual effects obtained by the reaction become less apparent and less effective. Copolymers and copolymer mixtures can also be used to vary the effect of the acrolein and obtain the desired degree of disassociation and hydrophilicity. In such copolymers the units derived from the acrolein monomer are the portions modified as aforesaid.

The methyl groups of the methacrolein can be substituted by ethyl, propyl, butyl, isopropyl, isobutyl, amyl, cyclohexyl or other alkyl groups and cycloaliphatic groups as well as aryl groups such as phenyl, naphthyl and the like. Alkaryl or aralkyl (benzyl, tolyl, etc.) alpha substituted acroleins can be used. These polymers have generally similar properties except for somewhat reduced hydrophilicity. Thus, in addition to methacrolein polymers and copolymers, the other alpha-substituted polymers and copolymers are also useful as well as mixtures thereof. In similar fashion, the term "alpha-substituted acrolein polymer" is used generically to include copolymers having substantial alpha-substituted acrolein residues present. Suitable alpha substituted acrolein polymers would be polymers and copolymers of alpha-hexyl acrolein, biphenyl acrolein, naphthyl acrolein, ethyl acrolein, propyl acrolein, phenyl acrolein, benzyl acrolein, tolyl acrolein, methyl phenyl acrolein, cyclohexyl acrolein, etc. Mixtures of the various acrolein monomers can be employed to provide polymers having different alpha substituents. The reaction products with $NH_3$ would have recurring units of the formula:

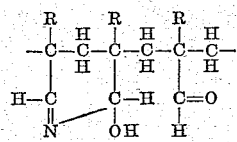

wherein R is an alkyl, alkaryl, aralkyl, cycloaliphatic and/or aryl group and is preferably an alkyl group of less than 4 carbon atoms. Where mixtures of different monomers are employed, the R groups will be different. While alpha-substituted acrolein polymers such as methacrolein are preferred, acrolein polymers (in which the alpha carbon atom has a hydrogen atom in place of the alpha substituted groups) may be used to obtain benefits of the present invention in which case R, above, is hydrogen.

Acrolein, ethacrolein and other alpha-substituted acrolein polymers or copolymers thereof can be formed by any recognized polymerization system, such as mass polymerization systems, emulsion and pearl or suspension polymerization systems. The suspension and emulsion polymerization systems are preferred because they are easier to work with.

The following examples will serve to illustrate the present invention with more particularly to those skilled in the art:

*Example I*

The following ingredients were placed in a closed vessel and subjected to intermittent agitation.

| | Parts |
|---|---|
| Water | 300 |
| Methacrolein | 100 |
| Persulfate initiator | .3 |
| An anionic active stabilizing agent (Duponal C) | 4.0 |

The pH of the recipe was adjusted to approximately 3.5 with acetic acid and the temperature was kept at approximately 50° C. At the end of 12 hours, the reaction proceeded to approximately 95 percent completion and a polymethacrolein latex was formed having about 25% solids. The yield was about 95 parts of polymethacrolein.

The persulfate initiator is added to speed up the reaction. Other initiators, such as hydrogen peroxide, benzoyl peroxide and cumene hydroperoxide, capable of providing free radicals, are also satisfactory. Air alone will initiate the reaction but it gives a very slow reaction in comparison to reactions employing conventional initiators.

*Example II*

The latex of Example I was mixed with distilled water to form a latex having approximately 10% solids. Approximately 500 grams of this latex representing about 50 grams dry weight polymethacrolein having a molecular weight of about 1000 were added to an autoclave, together with about 10 grams of concentrated ammonium hydroxide (15 normal) in solution. The molar excess of ammonia above that required for a 1:1 ratio with the polymer was about 200 percent. The pH of the resultant mixture was above 8 and the mixture was thoroughly stirred and the temperature increased to about 90° C. The major portion of the reaction was completed in about 2 to 3 hours and the mixture was then dried to yield the amine addition reaction product of the methacrolein polymer as previously described.

The reaction product obtained was found to be soluble in dilute aqueous acids such as hydrochloric, phosphoric, sulphuric and acetic acid solutions. For example, when treated with an acid such as HCl the reaction product of the present invention will form a soluble salt:

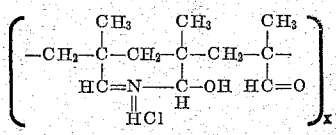

These solutions may be dried to provide salts of the amine addition product. Mineral acids are preferred in making such salts.

The acidified solutions formed are excellent emulsifying agents in minor amounts by weight. Oil and water emulsions, such as an emulsion of mineral, vegetable or animal oils, are readily formed. They are broken by neutralization with either strong or weak bases. The product of this invention is, therefore, extremely useful as a cationic emulsifier in the production of synthetic rubber and resins such as polybutadiene, polyisoprene, copolymers of butadiene and styrene and/or acrylonitrile and the like. They also find use in emulsion polymerization and dispersion of pigments, etc. When solutions of these amine reaction products are prepared with fugitive acids, they are valuable for imparting textiles with an alkali-resistant finish and are very useful as coatings and paper sizes and the like.

When the polymeric acrolein or alpha-substituted acrolein, in accordance with this invention, is reacted with primary monoalkyl, and primary monocycloaliphatic amines that do not effect the Cannizzaro reaction, similar valuable and useful amine reaction products are obtained which depend from the main acrolein polymer chain. Examples of useful primary amines are methyl amine, ethyl amine, isopropyl amine, butyl amine, amyl amine, hexyl amine, octylamine, isooctylamine, cyclobutyl amine, cyclopropyl amine, cyclohexyl amine, 4-methylcyclohexyl amine and the like and mixtures thereof as well as mixtures of these amines with ammonia and/or ammonium hydroxide. With primary alkyl or cycloaliphatic amines the following structures will be obtained:

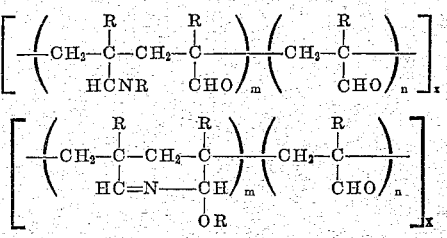

In accordance with this invention, it has been found that the average molecular weight of the acrolein or alpha-substituted acrolein should be at least about 500 to obtain substantial benefits, but, for most purposes, it is desirable that the average molecular weight be around 1,000 to 3,000 and even up to as high as 5,000 or more.

When anhydrous ammonia was substituted for the concentrated ammonium hydroxide of Example II, similar results were obtained. Other aqueous solutions of ammonium hydroxide may be used such as 6 normal up to 20 normal in amounts such that the ammonium hydroxide is present preferably in an amount of from about 1% to 15% of the total weight of the reaction mixture. Stated in another way the ammonia or amine is generally used in a molar excess over a 1:1 ratio with the methacrolein polymer and best results are obtained when the molar excess of ammonia and/or amine is about 50 to 500%, although amounts less than a 1:1 ratio, for example an 1:0.25 ratio of acrolein to ammonia and the like will afford some of the benefits of the present invention.

On the other hand, no reaction occurred when dibutyl amine and tributyl amine were used to treat polymethacrolein indicating that only ammonia, ammonium hydroxide and primary amines will form amine addition products which are soluble in dilute acids.

Polymerization may be obtained by temperatures preferably from about 45° to 130° C., although polymerization will take place at room temperatures at a very slow rate. The acrolein polymer may be reacted with ammonia, etc. to make the reaction product of the present invention in aqueous media as a suspension, dispersion, or emulsion, or in bulk or mass, or in an organic solvent. It is preferred to react the polymer in finely divided form in aqueous media, i.e., in an emulsion, suspension or latex.

While the invention has been described with reference to certain specific embodiments, it is to be understood that it is not limited thereto.

What we claim is:
1. The method which comprises reacting in aqueous media
  (1) at least one material selected from the group consisting of ammonia, ammonium hydroxide, a primary monoalkyl amine and a primary monocycloaliphatic amine with
  (2) an acrolein polymer being dispersed in said media, having an average molecular weight of at least about 500 and being selected from the group consisting of
  (2–I) a polymer consisting essentially of recurring units of A and
  (2–II) a polymer consisting essentially of recurring units of a predominating amount of A and the balance B,
where A has the general structural formula:

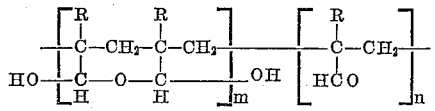

where B is a recurring unit of at least one copolymerized monomer selected from the group consisting of butadiene, isoprene, chloroprene, cyanoprene, dimethyl butadiene, styrene, acrylonitrile, and methyl isopropenyl ketone, said (1) being used in an amount of at least 0.25 mole per mole of said (2),
to form an amine addition product of said (2) and to convert at least 25% of said (A) units to units selected from the group consisting of
(A–1) having the general structural formula:

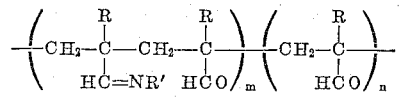

and
(A–2) having the general structural formula:

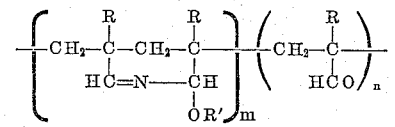

where R is selected from the group consisting of hydrogen, alkyl, alkaryl, aralkyl, aryl and cycloaliphatic radicals,
where R' is selected from the group consisting of hydrogen, alkyl and cycloaliphataic radicals,
where $m$ is an integer greater than 5, and
where $n$ is an integer greater than 1.

2. The method according to claim 1 where said (1) is used in a molar excess over the amount of said (2), and where said (2) has an average molecular weight of at least about 100.

3. The method according to claim 2 where said (1) is used in a molar excess of from about 50 to 500% over a molar ratio of said (1) to said (2) of 1:1.

4. The method according to claim 1 where said amine addition product is reacted with a dilute aqueous acid solution to form a soluble salt.

5. The method according to claim 4 where said amine addition product is dried before reacting it with said acid solution and wherein said soluble salt is subsequently dried.

6. The product produced by the method of claim 1.
7. The product produced by the method of claim 4.

References Cited by the Examiner
UNITED STATES PATENTS

| | | | |
|---|---|---|---|
| 2,651,624 | 9/53 | Swart | 260—72 |
| 2,676,166 | 4/54 | Webers | 260—67 |
| 2,930,779 | 3/60 | Drechsel | 260—72 |

FOREIGN PATENTS 803,053  10/58  Great Britain.

OTHER REFERENCES

"Handbook of Chemistry and Physics," 42nd ed., 1960, Chemical Rubber Publishing Co., Cleveland, Ohio, pages 1749–1751 relied upon.

LEON J. BERCOVITZ, *Primary Examiner.*

D. ARNOLD, *Examiner.*

UNITED STATES PATENT OFFICE
CERTIFICATE OF CORRECTION

Patent No. 3,177,171                          April 6, 1965

Elbert E. Gruber et al.

It is hereby certified that error appears in the above numbered patent requiring correction and that the said Letters Patent should read as corrected below.

Column 4, lines 63 to 66, at the end of the first formula insert -- or --; column 6, line 29, for "100" read -- 1000 --.

Signed and sealed this 28th day of September 1965.

(SEAL)
Attest:

ERNEST W. SWIDER
Attesting Officer

EDWARD J. BRENNER
Commissioner of Patents